US007956563B2

(12) United States Patent
Perisic et al.

(10) Patent No.: US 7,956,563 B2
(45) Date of Patent: Jun. 7, 2011

(54) SYSTEM FOR USING A MULTI-PHASE MOTOR WITH A DOUBLE-ENDED INVERTER SYSTEM

(75) Inventors: Milun Perisic, Torrance, CA (US); Silva Hiti, Redondo Beach, CA (US); Brian A. Welchko, Torrance, CA (US); Sibaprasad Chakrabarti, Torrance, CA (US); James M. Nagashima, Cerritos, CA (US); Gregory S. Smith, Woodland Hills, CA (US); George John, Cerritos, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 429 days.

(21) Appl. No.: 12/110,946

(22) Filed: Apr. 28, 2008

(65) Prior Publication Data

US 2009/0033274 A1 Feb. 5, 2009

Related U.S. Application Data

(60) Provisional application No. 60/952,739, filed on Jul. 30, 2007.

(51) Int. Cl.
*H02P 27/06* (2006.01)
*H02P 4/00* (2006.01)
(52) U.S. Cl. ............... 318/440; 318/139; 318/400.41; 307/9.1; 307/10.1; 363/133; 363/140; 180/65.1
(58) Field of Classification Search .............. 318/85, 318/378, 400.41, 727, 801, 34, 376, 772, 318/105, 139, 113, 440, 711; 363/17, 133, 363/140; 180/65.25, 65.1; 307/9.1, 10.1; 903/940
See application file for complete search history.

(56) References Cited

U.S. PATENT DOCUMENTS 5,352,964 A * 10/1994 Nakamura et al. ............ 318/772
5,389,749 A 2/1995 Hokari et al.
(Continued)

FOREIGN PATENT DOCUMENTS

CN 1102919 A 5/1995
(Continued)

OTHER PUBLICATIONS

Singh, G.K., "Multi-Phase Induction Machine Drive Research—A Survey," Elsevier Science B.V., Electric Power Systems Research, 2002, pp. 139-147.
(Continued)

*Primary Examiner* — Paul Ip
(74) *Attorney, Agent, or Firm* — Ingrassia Fisher & Lorenz, P.C.

(57) ABSTRACT

Systems and apparatus are provided for an inverter system for use in a vehicle having a first energy source and a second energy source. The inverter system comprises an electric motor having a first set of windings and a second set of windings. The inverter system further comprises a first inverter coupled to the first energy source and adapted to drive the electric motor, wherein the first set of windings are coupled to the first inverter. The inverter system also comprises a second inverter coupled to the second energy source and adapted to drive the electric motor, wherein the second set of windings are coupled to the second inverter. A controller is coupled to the first inverter and the second inverter to achieve desired power flow between the first energy source, the second energy source, and the electric motor.

18 Claims, 3 Drawing Sheets

U.S. PATENT DOCUMENTS

| | | | |
|---|---|---|---|
| 5,514,944 A | 5/1996 | Miyazaki | |
| 5,705,909 A * | 1/1998 | Rajashekara | 318/801 |
| 6,067,237 A * | 5/2000 | Nguyen | 363/17 |
| 6,236,583 B1 * | 5/2001 | Kikuchi et al. | 363/132 |
| 6,291,963 B2 | 9/2001 | Nakano | |
| 6,510,063 B2 | 1/2003 | Kobayashi et al. | |
| 6,630,804 B2 * | 10/2003 | Moriya et al. | 318/85 |
| 6,676,400 B2 | 1/2004 | Ito | |
| 6,759,818 B2 * | 7/2004 | Oyori | 318/34 |
| 7,099,756 B2 | 8/2006 | Sato | |
| 7,130,205 B2 | 10/2006 | Peng | |
| 7,154,237 B2 | 12/2006 | Welchko et al. | |
| 7,199,535 B2 | 4/2007 | Welchko et al. | |
| 7,259,530 B2 | 8/2007 | Ochiai et al. | |
| 7,276,865 B2 | 10/2007 | Ochiai | |
| 7,294,984 B2 * | 11/2007 | Urakabe et al. | 318/378 |
| 7,372,712 B2 | 5/2008 | Stancu et al. | |
| 7,439,697 B2 * | 10/2008 | Miyazaki et al. | 318/400.41 |
| 2002/0105300 A1 * | 8/2002 | Moriya et al. | 318/727 |
| 2007/0069673 A1 * | 3/2007 | Oyobe et al. | 318/376 |
| 2007/0120520 A1 * | 5/2007 | Miyazaki et al. | 318/801 |
| 2007/0274109 A1 | 11/2007 | Oyobe et al. | |
| 2009/0127948 A1 * | 5/2009 | Shimizu et al. | 310/71 |
| 2009/0128076 A1 * | 5/2009 | Taniguchi | 318/400.41 |
| 2010/0116571 A1 * | 5/2010 | Suzuki | 180/65.25 |
| 2010/0181829 A1 * | 7/2010 | Ichikawa et al. | 307/9.1 |

FOREIGN PATENT DOCUMENTS

| | | |
|---|---|---|
| CN | 1946587 A | 4/2007 |
| EP | 1808958 A2 | 7/2007 |

OTHER PUBLICATIONS

Peng, Fang Zheng, "Z-Source Inverter," IEEE Transactions on Industry Applications, Mar./Apr. 2003, vol. 39, No. 2, pp. 504-510.

Jones, Martin et al., "A Six-Phase Series-Connected Two-Motor Drive With Decoupled Dynamic Control," IEEE Transactions on Industry Applications, Jul./Aug. 2005, vol. 41, No. 4, pp. 1056-1066.

Welchko, Brian A., "A Double-Ended Inverter System for the Combined Propulsion and Energy Management Functions in Hybrid Vehicles with Energy Storage," The 31st Annual Conference of the IEEE Industrial Electronics Society, IECON '05, Raleigh, North Carolina, Nov. 6-10, 2005, pp. 1-6.

Levi, Emil et al., "A Series-Connected Two-Motor Six-Phase Drive With Induction and Permanent Magnet Machines," IEEE Transactions on Energy Conversion, Mar. 2006, vol. 21, No. 1, pp. 121-129.

Li, S., et al. "Design of Six-phase Induction Motor Vector Control System Based on DSP—Large Electric Machine and and Hydraulic Turbine," Turbine Technology, Jun. 2005, pp. 23-26, vol. 3.

Chinese Office Action issued Jul. 29, 2010, for Application No. 20081021523.

Chinese Office Action dated Sep. 3, 2010, issued in Application No. 200810214793.1.

Office Action dated Aug. 18, 2010, issued in U.S. Appl. No. 12/113,710.

Final Office Action for U.S. Appl. No. 12/113,710 mailed Jan. 25, 2011.

* cited by examiner

SYSTEM FOR USING A MULTI-PHASE MOTOR WITH A DOUBLE-ENDED INVERTER SYSTEM

CROSS-REFERENCE TO RELATED APPLICATION(S)

This application claims the benefit of U.S. provisional patent application Ser. No. 60,952,739, filed Jul. 30, 2007.

TECHNICAL FIELD

Embodiments of the subject matter described herein relate generally to vehicle drive systems, and more particularly, embodiments of the subject matter relate to hybrid vehicles having a double-ended inverter drive system.

BACKGROUND

In recent years, advances in technology, as well as ever evolving tastes in style, have led to substantial changes in the design of automobiles. One of the changes involves the power usage and complexity of the various electrical systems within automobiles, particularly alternative fuel vehicles, such as hybrid, electric, and fuel cell vehicles.

Many of the electrical components, including the electric motors used in such vehicles, receive electrical power from alternating current (AC) power supplies. However, the power sources (e.g., batteries) used in such applications provide only direct current (DC) power. Thus, devices known as "power inverters" are used to convert the DC power to AC power, which often utilize several of switches, or transistors, operated at various intervals to convert the DC power to AC power.

Additionally, such vehicles, particularly fuel cell vehicles, often use two separate voltage sources (e.g., a battery and a fuel cell) to power the electric motors that drive the wheels. "Power converters," such as direct current-to-direct current (DC/DC) converters, are typically used to manage and transfer the power from the two voltage sources. Modern DC/DC converters often include transistors electrically interconnected by an inductor. By controlling the states of the various transistors, a desired average current can be impressed through the inductor and thus control the power flow between the two voltage sources.

The utilization of both a power inverter and a power converter greatly increases the complexity of the electrical system of the automobile. The additional components required for both types of devices also increase the overall cost and weight of the vehicle. Accordingly, systems and methods have been developed for operating a motor coupled to multiple power sources without a DC/DC converter while maximizing the performance of the motor by utilizing dual inverter electrical systems.

Prior art systems are limited to designs for three-phase motors traditionally used in automobiles. However, multiphase motor drives with more than three phases operate with improved efficiency and reduce the required inverter per-phase power rating. In some cases, this may result in cheaper and more compact power inverters in addition to improved motor performance.

Accordingly, it is desirable to provide a dual inverter system to accommodate multi-phase machines having more than three motor phases. Other desirable features and characteristics of the present invention will become apparent from the subsequent detailed description and the appended claims, taken in conjunction with the accompanying drawings and the foregoing technical field and background

BRIEF SUMMARY

An apparatus is provided for an automotive drive system. The automotive drive system comprises an electric motor having a first set of windings and a second set of windings. A first inverter is adapted to drive the electric motor, wherein the first set of windings is coupled to the first inverter. A second inverter is adapted to drive the electric motor, wherein the second set of windings is coupled to the second inverter.

An apparatus is provided for an energy transfer system. The energy transfer system comprises a six-phase motor having a first three-phase set of windings and a second three-phase set of windings. The energy transfer system also comprises a double-ended inverter system adapted to drive the six-phase motor. The double-ended inverter system comprises a first inverter coupled to the first three-phase set of windings and a second inverter coupled to the second three-phase set of windings.

An apparatus is provided for an inverter system for use in a vehicle having a first energy source and a second energy source. The inverter system comprises an electric motor having a first set of windings and a second set of windings. The inverter system further comprises a first inverter coupled to the first energy source and adapted to drive the electric motor, wherein the first set of windings are coupled to the first inverter. The inverter system also comprises a second inverter coupled to the second energy source and adapted to drive the electric motor, wherein the second set of windings are coupled to the second inverter. A controller is coupled to the first inverter and the second inverter. The controller is configured to control the first inverter and the second inverter to achieve desired power flow between the first energy source, the second energy source, and the electric motor.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown herein depict exemplary arrangements of elements, additional intervening elements, devices, features, or components may be present in an embodiment of the depicted subject matter. The terms "first", "second" and other such numerical terms referring to structures do not imply a sequence or order unless clearly indicated by the context.

Figure 1:
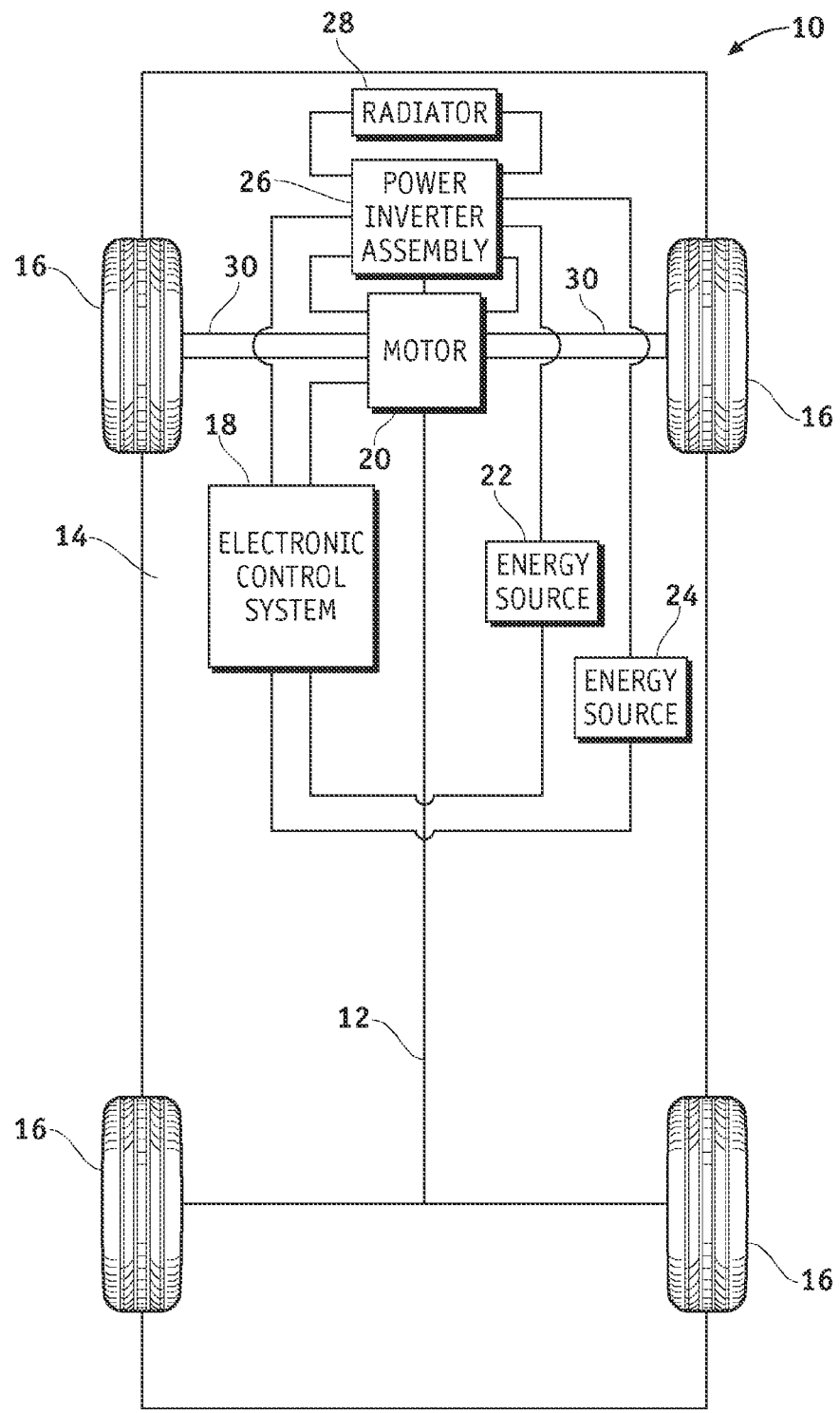
FIG. 1 is a schematic view of an exemplary automobile in accordance with one embodiment.

FIG. 1 illustrates a vehicle, or automobile 10, according to one embodiment of the present invention. The automobile 10 includes a chassis 12, a body 14, four wheels 16, and an electronic control system 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and natural gas) fueled engine, a combustion/electric motor hybrid engine, and an electric motor.

In the exemplary embodiment illustrated in FIG. 1, the automobile 10 further includes a motor 20 (i.e., an electric motor/generator, traction motor, etc.), a first energy source 22, a second energy source 24, a power inverter assembly 26, and a radiator 28. The radiator 28 is connected to the frame at an outer portion thereof and although not illustrated in detail, includes multiple cooling channels that contain a cooling fluid (i.e., coolant), such as water and/or ethylene glycol (i.e., "antifreeze), and is coupled to the power inverter assembly 26 and the motor 20. In one embodiment, the power inverter assembly 26 receives and shares coolant with the electric motor 20. As shown in FIG. 1, the motor 20 may also include a transmission integrated therein such that the motor 20 and the transmission are mechanically coupled to at least some of the wheels 16 through one or more drive shafts 30.

As shown, the first energy source 22 and the second energy source 24 are in operable communication and/or electrically coupled to the electronic control system 18 and the power inverter assembly 26. Although not illustrated, the first energy source 22 and the second energy source 24 may vary depending on the embodiment and may be of the same or different type. In one or more embodiments, the first energy source 22 and second energy source 24 may each comprise a battery, a fuel cell, an ultracapacitor, or another suitable voltage source. A battery may be any type of battery suitable for use in a desired application, such as a lead acid battery, a lithium-ion battery, a nickel-metal battery, or another rechargeable battery. An ultracapacitor may comprise a supercapacitor, an electrochemical double layer capacitor, or any other electrochemical capacitor with high energy density suitable for a desired application.

Figure 2:
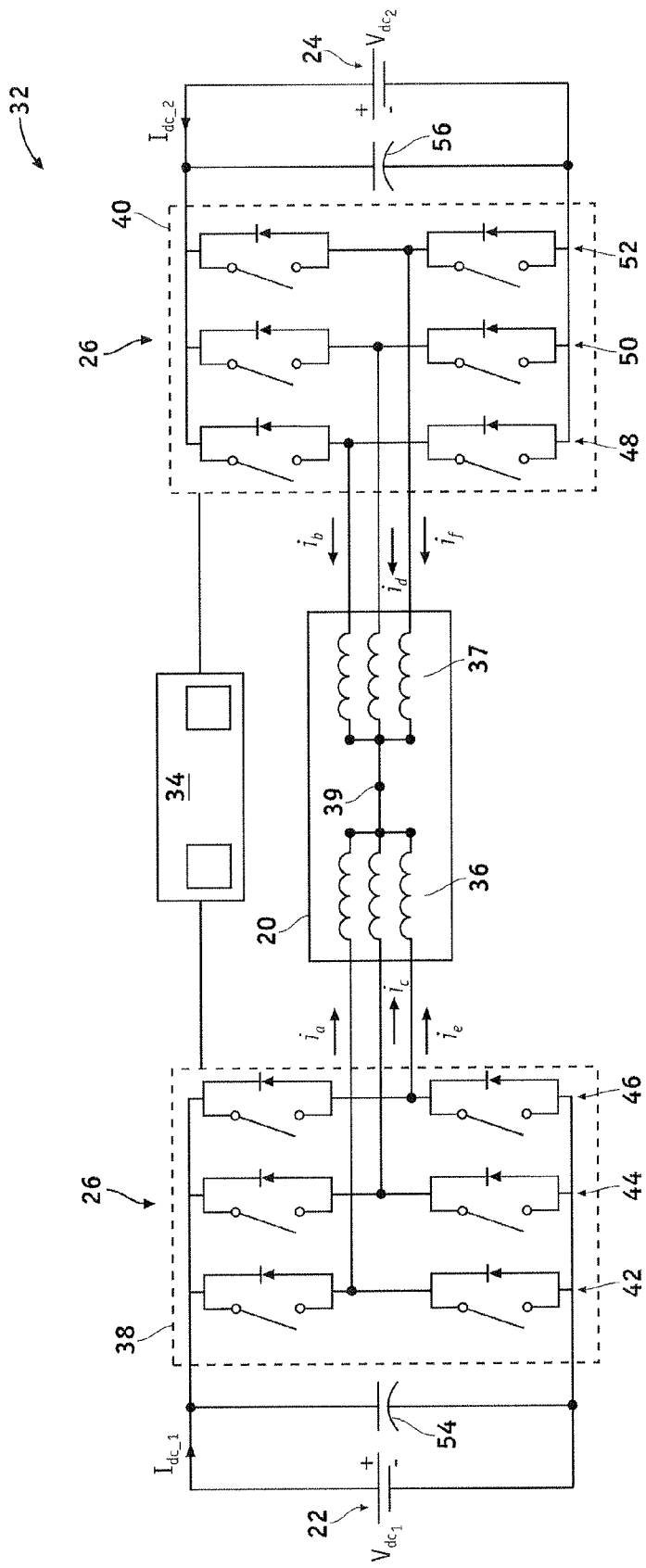
FIG. 2 is a schematic view of a double-ended inverter system in accordance with one embodiment.

Referring now to FIGS. 1 and 2, a double-ended inverter system 32 may be adapted to drive a multi-phase motor 20 within the automobile 10 in accordance with one embodiment. The double-ended inverter system 32 includes the motor 20, the first energy source 22, the second energy source 24, the power inverter assembly 26, and a controller 34.

The motor 20 is a multi-phase alternating current (AC) motor and includes a first set of windings 36 (or coils) and a second set of windings 37, wherein each winding corresponds to one phase of the motor 20. Although not illustrated, the motor 20 includes a stator assembly (including the coils), a rotor assembly (including a ferromagnetic core), and a cooling fluid (i.e., coolant), as will be appreciated by one skilled in the art. The motor 20 may be an induction motor, a permanent magnet motor, or any type suitable for the desired application.

In an exemplary embodiment, the motor 20 is a six-phase motor, with the first set of windings 36 and the second set of windings 37 each corresponding to electrically isolated three-phase wiring structures. It should be noted the sets of windings 36 and 37 are electrically isolated, meaning that the current in each set of windings 36 and 37 may be controlled independently and differ from the current in the other set of windings 36 and 37. The sets of windings 36 and 37 may still transfer energy to the other set of windings 36 and 37 electromagnetically using magnetomotive force generated by the motor 20. The controller 34 may independently control the manner in which power flows from each energy source 22 and 24 to achieve a desired power flow.

In accordance with one embodiment, the first set of windings 36 and the second set of windings 37 may each be configured as a wye connection. In an exemplary embodiment, the first set of windings 36 and the second set of windings 37 are connected to create a neutral point 39 in the motor 20. The windings 36 and 37 may be connected to create the neutral point 39 internally within the motor 20, which reduces the number of terminals/connections on the stator (i.e., 6 terminals as opposed to 12).

The use of a multi-phase motor 20 coupled to two energy sources 22 and 24 is desirable, particularly in an automobile 10 operating in a hybrid/electric mode, because it provides improved reliability. For example, if a first energy source 22, such as a battery in an automobile 10 fails for some reason (i.e. cold or inclement weather), the multi-phase motor 20 may still by started and driven by the second energy source 24 independently.

Additionally, it will be appreciated by those of skill in the art that a multi-phase motor 20 can provide additional advantages over a conventional lower phase (i.e., three-phase) machine depending on the spatial displacement of the two sets of windings 36 and 37 within the stator. For example, a 30° spatial displacement between two sets of windings 36 and 37 may reduce or eliminate air gap flux harmonics and corresponding torque harmonics and rotor core and/or copper losses produced by those air flux harmonics. The spatial displacement of the windings 36 and 37 and phase-connections may be varied to suit a desired application. In an exemplary embodiment, the fundamental frequencies of the two inverters 38 and 40 are the same, resulting in a more sinusoidal field distribution and current.

Referring again to FIG. 2, the power inverter assembly 26 includes a first inverter 38 and a second inverter 40, each including six switches (e.g., semiconductor devices, such as transistors and/or switches) with antiparallel diodes (i.e., antiparallel to each switch). As shown, the switches in the inverters 38 and 40 are arranged into three pairs (or legs), with pairs 42, 44, and 46 being in the first inverter 38 and pairs 48, 50, and 52 being in the second inverter 40.

In an exemplary embodiment, a first phase ($i_a$) of the first set of windings 36 of the motor 20 is electrically connected between the switches of switch pair 42 in the first inverter 38. A second phase ($i_c$) of the first set of windings 36 is connected between the switches of pair 44 in the first inverter 38 and a third phase ($i_e$) of the first set of windings 36 is connected between the switches of pair 46. In an exemplary embodiment, the opposing ends of the first phase, the second phase, and the third phase may be connected to create a neutral point 39. Similarly, in an exemplary embodiment, the three phases ($i_b$, $i_d$, $i_f$) of the second set of windings 37 may be connected between the switches of pairs 48, 50, and 52, and connected to the neutral point 39 as shown.

Using a multi-phase motor 20 can reduce the required current per phase without reducing the voltage per phase, which allows use of a first inverter 38 and a second inverter 40 with lower power rating. As a result, a smaller and more compact double-ended inverter system 32 can be used to achieve increased power density. Also, in this configuration, because the energy sources 22 and 24 are electrically isolated, energy sources 22 and 24 with different voltage levels, power ratings, operating characteristics, etc. may be used simultaneously. This is particularly advantageous compared to other inverter systems where, as a practical matter, the energy sources 22 and 24 are required to be nearly identical. For example, in this case, a high voltage source ($\geq 100V$) may be used with a 12 V battery to simultaneously drive the motor 20.

Still referring to FIG. 2, the double-ended inverter system 32 may also include first and second capacitors 54 and 56 respectively connected in parallel with the first and second energy sources 22 and 24 to smooth current ripple during operation. The controller 34 is in operable communication and/or electrically connected to the first and second inverters 38 and 40. The controller 34 is responsive to commands received from the driver of the automobile 10 (i.e. via an accelerator pedal) and provides commands to the first inverter 38 and the second inverter 40, as will be described, to control the output of the inverters 38 and 40.

Referring again to FIG. 1, the electronic control system 18 is in operable communication with the motor 20, the first energy source 22, the second energy source 24, and the power inverter assembly 26. Although not shown in detail, the electronic control system 18 may include various sensors and automotive control modules, or electronic control units (ECUs), such as an inverter control module (i.e., the controller 34 shown in FIG. 2) and a vehicle controller, and at least one processor and/or a memory which includes instructions stored thereon (or in another computer-readable medium) for carrying out the processes and methods as described below.

During operation, the automobile 10 is operated by providing power to the wheels 16 with the electric motor 20 which receives power from the first energy source 22 and the second energy source 24 in an alternating manner and/or with the first energy source 22 and the second energy source 24 simultaneously. In order to power the motor 20, DC power is provided from the first energy source 22 and the second energy source 24 to the first and second inverters 38 and 40 respectively, which convert the DC power into AC power, as is commonly understood in the art. The first and second inverters 38 and 40 produce AC voltages across the windings 36 and 37 (or phases). As is commonly understood, the required voltages across the windings 36 and 37 of the motor 20 (FIG. 2) are dependent on the speed, commanded torque (i.e., commanded synchronous frame currents), and other motor parameters.

If the motor 20 does not require the maximum power output of one energy source 22 or 24, the extra power from the energy source 22 or 24 may be used to charge the other energy source 22 or 24. For illustrative purposes and the sake of brevity, it may be discussed as though the first energy source 22 produces excess power to charge the second energy source 24, however, it will be appreciated by those skilled in the art that numerous alternative desired power flows are possible and this distinction is not limiting but made merely for reference purposes.

During the operation of the motor 20, the first energy source 22 may have the capability to deliver an excess amount of power (i.e., reserve power), in addition to the power required by the motor 20 to produce the commanded torque. This excess power may be supplied to and stored by the second voltage source 24 and may be considered a negative DC current in the voltage bus of the second voltage source 24 because of the indicated directions of current flow shown in FIG. 2. The reserve power may be understood to be the difference between the power required by the motor 20 and the maximum power output of the first energy source 22.

Under some operating conditions, the maximum power output of the first energy source 22 may be less than the power required by the motor 20. If the motor 20 requires both the maximum power output of the first energy source 22, as well as power from the second energy source 24, the controller 34 may be configured to control power flow from the second energy source 24 to the motor 20 in combination with the first energy source 22.

In other operating conditions, the first energy source 22 may fail for some reason (i.e., cold temperatures or inclement weather). In one embodiment, the second energy source 24 may be designed to operate in cold temperatures, in which case the controller 34 may control power flow from the second energy source 24 to the motor 20.

Many combinations of voltage across the windings 36 and 37 may produce the required torque in the motor 20 and achieve desired power flow to (or from) the energy sources 22 and 24 and the motor 20. An optimal operating point determines the modulating voltage across the terminals of the inverters 38 and 40. It will be appreciated by those skilled in the art that conditions for determining an optimal operating point are left to the designer and will vary depending upon the application for which the motor 20 is being used, along with the types of energy sources 22 and 24 selected.

Figure 3:
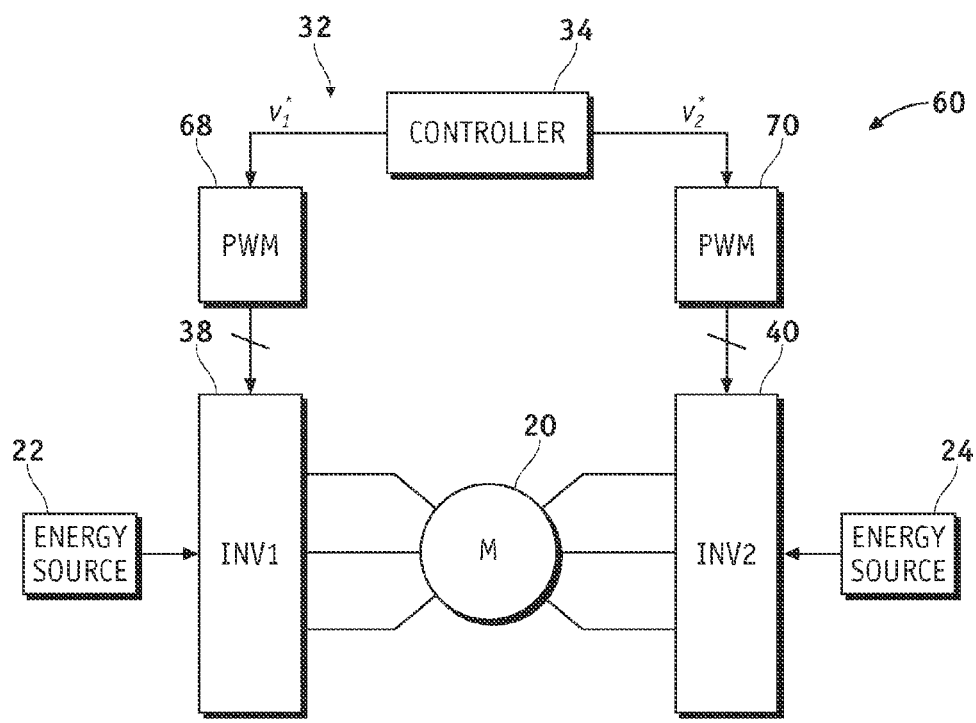
FIG. 3 is a schematic view of a control system for operating the double-ended inverter system of FIG. 2 in accordance with one embodiment.

FIG. 3 illustrates a control system 60 for operating a motor 20 in a double-ended inverter system 32 utilizing the principles described above in accordance with one embodiment. High frequency pulse width modulation (PWM) may be employed by the controller 34 to modulate and control the inverters 38 and 40 and manage the voltage produced by the inverters 38 and 40. The control system 60 includes first and second PWM blocks 68 and 70, and the double-ended inverter system 32.

The controller 34 provides a control algorithm that achieves desired power flow between the first and second energy sources 22 and 24 while producing the commanded torque inside the motor 20. Although not shown, the control system 60 receives a torque command for the motor 20 from which the controller 34 may determine power commands for the first energy source 22 (and/or the first inverter 38) and the second energy source 24 (and/or the second inverter 40), as well as synchronous frame currents for the windings 36 and 37 within the motor 20.

The controller 34 provides the first and second PWM blocks 68 and 70 with modulating voltage signals $v^*_1$ and $v^*_2$ to generate PWM signals to operate the switches within the first and second inverters 38 and 40 to cause the desired output voltages to be applied across the windings 36 and 37 within the motor 20, shown in FIG. 2, to operate the motor 20 with the required torque. If there is an excess of voltage, or power, on the first inverter 38 (and/or first energy source 22) side of the double-ended inverter system 32, power flows from the first energy source 22, through the windings 36, and the controller 34 may be configured to control electromagnetic charging of the second energy source 24 by the electric motor 20. If there is a shortage of power on the first inverter 38 side of the double-ended inverter system 32, the controller 34 may be configured to control power flow from the second energy source 24 into the motor 20. It will be appreciated by those skilled in the art that the control system 60 can be further modified to incorporate appropriate feedback signals and other methods known in the art to control the inverters 38 and 40, which are beyond the scope of this disclosure.

One advantage of the system and/or method described above is that the electrical system used to power the motor 20 with two separate energy sources 22 and 24 is greatly simplified, as a conventional DC/DC power converter is not required. Using a multi-phase motor 20 reduces the current per-phase of the inverters 38 and 40, allowing for the use of more compact inverters 38 and 40 with a lower power rating. As a result, the overall cost and weight of the vehicle may be reduced. However, as the described above, the performance of the motor 20 is not impaired as the commanded torque may still be generated within the motor 20, while allowing excess power to flow between the energy sources 22 and 24.

Other embodiments may utilize system and method described above in different types of automobiles, different vehicles (e.g., watercraft and aircraft), or in different electrical systems altogether, as it may be implemented in any situation where the voltages of the two sources dynamically change over a wide range. The electric motor 20 and the inverters 38 and 40 may have different numbers of phases, and the systems described herein should not be construed as limited to a six-phase design. Other forms of energy sources 22 and 24 may be used, such as current sources and loads including diode rectifiers, thyristor converters, fuel cells, inductors, capacitors, and/or any combination thereof.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An automotive drive system comprising:
    an electric motor having a first set of windings and a second set of windings, wherein the first set of windings is connected to the second set of windings to create a neutral point;
    a first inverter adapted to drive the electric motor, wherein the first set of windings is coupled to the first inverter;
    a second inverter adapted to drive the electric motor, wherein the second set of windings is coupled to the second inverter;
    a first energy source coupled to the first inverter; and
    a second energy source coupled to the second inverter.

2. The automotive drive system of claim 1 wherein the electric motor is a six-phase motor.

3. The automotive drive system of claim 2, wherein the first set of windings comprises a first three-phase winding structure and the second set of windings comprises a second three-phase winding structure.

4. The automotive drive system of claim 3, wherein the first three-phase winding structure is configured as a wye connection and the second three-phase winding structure is configured as a wye connection.

5. The automotive drive system of claim 4, wherein the first three-phase winding structure is connected to the second three-phase winding structure to create the neutral point.

6. The automotive drive system of claim 1, wherein the first energy source is selected from a group consisting of a first battery, a first fuel cell, and a first ultracapacitor.

7. The automotive drive system of claim 6, wherein the second energy source is selected from a group consisting of a second battery, a second fuel cell, and a second ultracapacitor.

8. The automotive drive system of claim 1, wherein the electric motor is selected from a group consisting of an induction motor and a permanent magnet motor.

9. An energy transfer system comprising:
    a six-phase motor having a first three-phase set of windings and a second three-phase set of windings; and
    a double-ended inverter system adapted to drive the six-phase motor, the double-ended inverter system comprising:
        a first inverter coupled to the first three-phase set of windings, the first inverter being configured to be coupled to a first energy source; and
        a second inverter coupled to the second three-phase set of windings, the second inverter being configured to be coupled to a second energy source.

10. The energy transfer system of claim 9, wherein the six-phase motor is selected from a group consisting of an induction motor and a permanent magnet motor.

11. An inverter system for use in a vehicle having a first energy source and second energy source, the inverter system comprising:
    an electric motor having a first set of windings and a second set of windings, the first set of windings being electrically isolated from the second set of windings;
    a first inverter coupled to the first energy source and adapted to drive the electric motor, wherein the first set of windings are coupled to the first inverter;
    a second inverter coupled to the second energy source and adapted to drive the electric motor, wherein the second set of windings are coupled to the second inverter; and
    a controller coupled to the first inverter and the second inverter, the controller being configured to control the first inverter and the second inverter to achieve desired power flow between the first energy source, the second energy source, and the electric motor.

12. The inverter system of claim 11, wherein the controller is configured to control power flow from the first energy source to drive the electric motor.

13. The inverter system of claim 12, wherein the controller is configured to control electromagnetic charging of the second energy source by the electric motor.

14. The inverter system of claim 11 wherein the controller is configured to control electromagnetic charging of the first energy source by the electric motor.

15. The inverter system of claim 11, wherein the controller is configured to operate the first inverter and the second inverter at the same fundamental frequency.

16. The inverter system of claim 11, wherein the first energy source has a first power rating and the second energy source has a second power rating, the second power rating having a ratio to the first power rating within 10% to 100%.

17. The inverter system of claim 11, wherein the first inverter has a first power rating and the second inverter has a second power rating, the first power rating and the second power rating being independent.

18. The inverter system of claim 11, wherein the first set of windings is connected to the second set of windings to create a neutral point.

* * * * *